(12) United States Patent
Patil et al.

(10) Patent No.: US 8,733,745 B2
(45) Date of Patent: May 27, 2014

(54) LOAD MOUNT JOUNCE RATE CUP

(75) Inventors: Ravindra P Patil, Troy, MI (US);
Robert T. Jane, Orion, MI (US);
Michael A. Ray, Sterling Heights, MI
(US); Robert L. Geisler, Grand Blanc,
MI (US); Joseph A. Schudt, Macomb,
MI (US)

(73) Assignee: GM Global Technology Operations LLC, Detroit, MI (US)

(*) Notice: Subject to any disclaimer, the term of this patent is extended or adjusted under 35 U.S.C. 154(b) by 53 days.

(21) Appl. No.: 13/471,540

(22) Filed: May 15, 2012

(65) Prior Publication Data

US 2013/0307204 A1 Nov. 21, 2013

(51) Int. Cl.
*B60G 13/00* (2006.01)

(52) U.S. Cl.
USPC .......... 267/220; 267/139; 267/140; 267/153; 267/293; 267/179; 280/124.147; 280/124.155; 188/322.12

(58) Field of Classification Search
USPC .......... 267/220, 219, 153, 35, 293, 139, 140, 267/195, 179; 280/124.155, 124.147; 188/322.12, 321.11
See application file for complete search history.

(56) References Cited

U.S. PATENT DOCUMENTS

| | | | | |
|---|---|---|---|---|
| 3,690,540 A | * | 9/1972 | Hardigg | 206/521 |
| 4,721,325 A | * | 1/1988 | Mackovjak et al. | 280/124.155 |
| 5,467,971 A | * | 11/1995 | Hurtubise et al. | 267/220 |
| 5,788,262 A | * | 8/1998 | Dazy et al. | 280/124.155 |
| 6,736,381 B2 | * | 5/2004 | Chesne | 267/220 |
| 6,893,011 B2 | * | 5/2005 | Schudt et al. | 267/220 |
| 7,077,248 B2 | * | 7/2006 | Handke et al. | 188/321.11 |
| 7,090,058 B2 | * | 8/2006 | Miyazaki et al. | 188/322.12 |
| 7,837,016 B2 | * | 11/2010 | Chamousset et al. | 188/321.11 |
| 8,123,203 B2 | * | 2/2012 | Patil et al. | 267/220 |
| 2003/0209395 A1 | * | 11/2003 | Fukaya | 188/322.12 |
| 2010/0127437 A1 | * | 5/2010 | Stevens et al. | 267/64.11 |

\* cited by examiner

*Primary Examiner* — Thomas J Williams
*Assistant Examiner* — Mariano Sy

(57) ABSTRACT

A vehicle suspension system including a shock upper mount assembly mounted to vehicle structure, a jounce bumper being made of an elastomeric material and including a vertically extending rod bore around a rod of a shock absorber, and a jounce rate cup. The jounce rate cup is made of an elastomeric material and includes a horizontally extending support flange having a lower surface mounted on the jounce bumper, a horizontally extending dust boot attachment flange spaced from the support flange and having an upper surface located below and adjacent to the shock upper mount assembly, and a vertical flange extending between the support flange and the dust boot attachment flange to define a gap between the support flange and the dust boot attachment flange, with the jounce rate cup including a vertically extending rod bore mounted around the rod.

15 Claims, 2 Drawing Sheets

LOAD MOUNT JOUNCE RATE CUP

BACKGROUND OF INVENTION

The present invention relates generally to vehicle suspension systems, and more particularly to mounting of the suspension to the vehicle body.

It is desirable to provide an energy mitigation device to reduce the peak suspension loads transmitted to the body structure. Having relatively high peak impact loads from the suspension into the body may require that the mass of the body adjacent to the suspension attachment is larger than desired. This increased mass also tends to increase the vehicle cost and may negatively impact fuel economy of the vehicle as well.

Previous suspension attachment assemblies have employed a urethane bumper, along with rigid plastic wedge on top of the bumper, to absorb jounce loads and transmit the loads through the shock upper mount assembly. However, this type of assembly still transmits jounce loads into the body that are higher than desired. This results in the mass and cost of the chassis and body systems of the vehicle that may be higher than is desired.

SUMMARY OF INVENTION

An embodiment contemplates a vehicle suspension system including a shock upper mount assembly mounted to vehicle structure, a jounce bumper being made of an elastomeric material and including a vertically extending rod bore around a rod of a shock absorber, and a jounce rate cup. The jounce rate cup is made of an elastomeric material and includes a horizontally extending support flange having a lower surface mounted on the jounce bumper, a horizontally extending dust boot attachment flange spaced from the support flange and having an upper surface located below and adjacent to the shock upper mount assembly, and a vertical flange extending between the support flange and the dust boot attachment flange to define a gap between the support flange and the dust boot attachment flange, with the jounce rate cup including a vertically extending rod bore mounted around the rod.

An advantage of an embodiment is that, with reduced peak jounce loads transmitted from the suspension into the vehicle body, the mass, and thus cost, of the body may be reduced. This reduced mass and cost is accomplished while still fitting within a desired packaging space and maintaining the desired characteristics, including free travel, of the suspension system.

DETAILED DESCRIPTION

Figure 1:
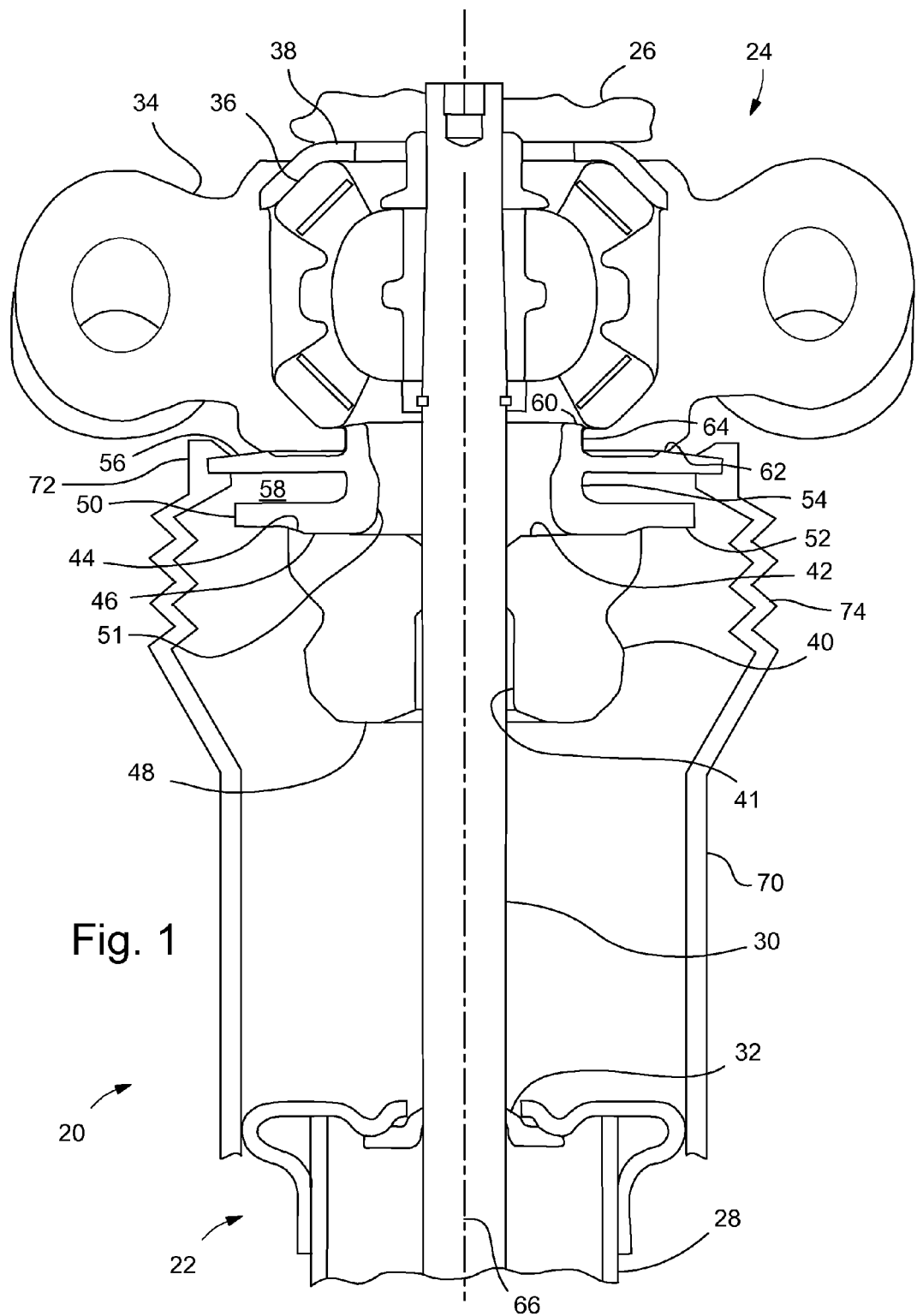
FIG. 1 is a schematic, sectional view of a portion of a vehicle suspension system.
Figure 2:
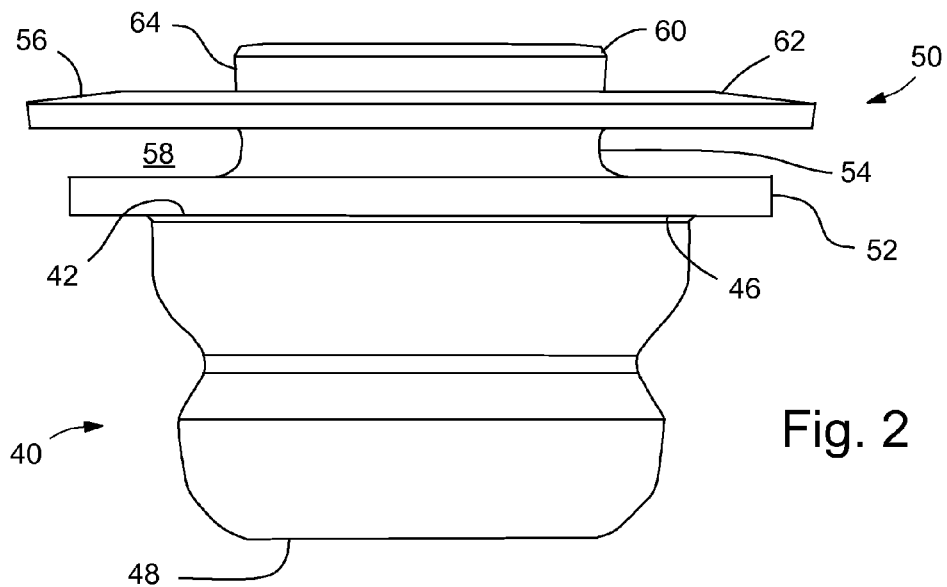
FIG. 2 is an elevation view of a load mount jounce rate cup and jounce bumper.
Figure 3:
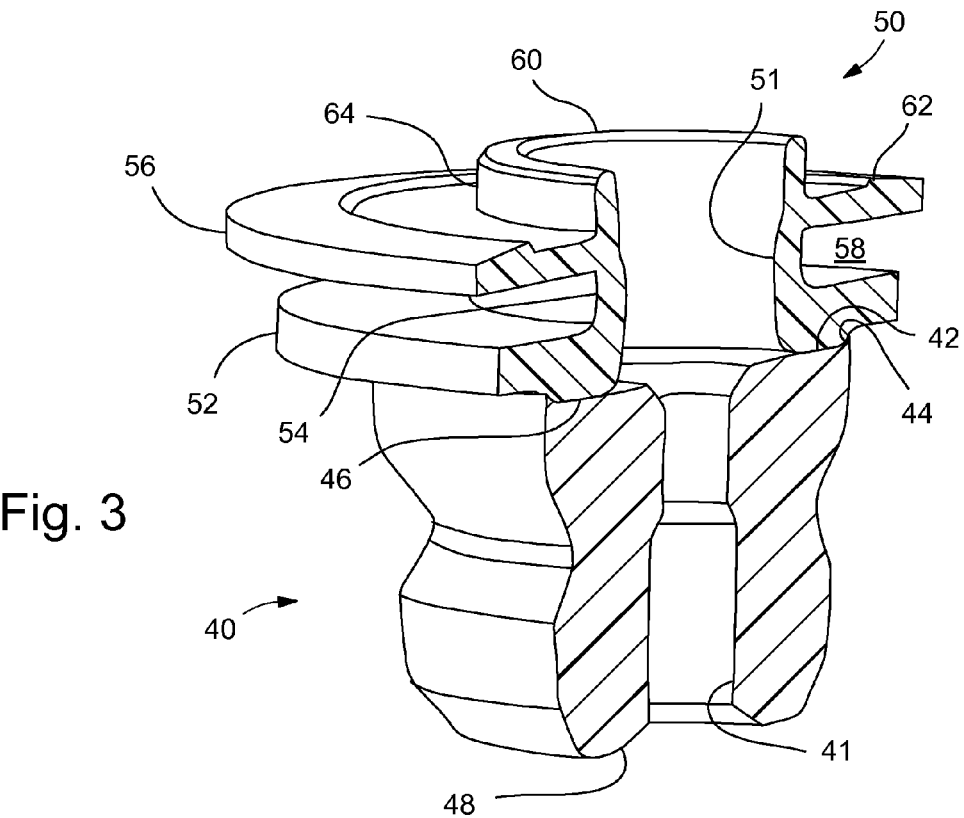
FIG. 3 is a perspective, partial cross section view of the jounce rate cup and jounce bumper.

Referring to FIGS. 1-3, a portion of a vehicle suspension system, indicated generally at 20, is shown. The suspension system 20 includes a shock absorber 22 mounted to a shock upper mount assembly 24. The upper mount assembly 24 mounts to vehicle structure 26.

The shock absorber 22 may include a dust tube 28 and a rod 30 extending through a rod seal 32 at the upper end of the dust tube 28. The shock absorber 22 may be conventional and so will not be discussed in further detail herein. The upper end of the rod 30 is mounted to the shock upper mount assembly 24.

The upper mount assembly 24 includes an upper mount housing (strut retainer) 34 that surrounds and encloses an upper mount bushing assembly 36. An upper mount housing cap 38 mounts to the upper mount housing 34 above the upper mount bushing assembly 36. The upper end of the rod 30 is secured to the bushing assembly 36. The bushing assembly 36 may be conventional and so will not be discussed in more detail herein.

A jounce bumper 40 includes a rod bore 41 through which the rod 30 extends and is located below the upper mount assembly 24. The jounce bumper 40 is formed of an elastomeric material that allows for elastic flexing when its bottom end 48 is impacted by the top of the dust tube 28. The jounce bumper 40 also includes an upper surface 42 that has an upwardly extending containment lip 44 extending around the periphery of the upper surface 42. The containment lip 44 helps to retain a lower surface 46 of a load mount jounce rate cup 50 between the jounce bumper 40 and the upper mount assembly 24.

The jounce rate cup 50 has a radially outward and horizontally extending support flange 52 that forms the lower surface 46 and supports the jounce rate cup 50 on the jounce bumper 40. The jounce rate cup 50 also includes a vertically extending flexing flange 54 forming a rod bore 51 extending around the rod 30 and a dust boot attachment flange 56 extending horizontally and radially outward from the flexing flange 54. The dust boot attachment flange 56 is located above and spaced from the support flange 52 to form a gap 58 between them. The dust boot attachment flange 56 also has an upper surface 62 in contact with the underside of the upper mount housing 34. An upper mount engagement flange 60 of the jounce rate cup 50 extends vertically above the dust boot attachment flange 56 and around the rod 30. An outer cylindrical surface 64 of the upper mount engagement flange 60 engages the upper mount housing 34 to hold the upper portion of the jounce rate cup 50 generally centered about a longitudinal axis 66 of the rod 30.

The jounce rate cup 50 may be made of thermoplastic polyurethane (TPU) or other suitable elastomeric material that will elastically flex when pressed upwardly by the jounce bumper 40 and return to its original shape when the load is removed. The jounce rate cup 50 is also preferably formed as a single, monolithic part.

A dust boot 70 has an upper mounting flange 72 that is secured to the dust boot attachment flange 56 and a corrugated section 74 that allows for axial compression and extension as the shock absorber 22 moves during vehicle operation while keeping contaminants away from the rod 30.

During vehicle operation, the vehicle suspension system 20 absorbs impact loads imparted to the vehicle from a road surface. Under certain conditions, the impact may be sufficient to cause the upper end of the dust tube 28 to impact the bottom end 48 of the jounce bumper 40. The jounce bumper 40, in turn, pushes on the lower surface 46 of the jounce rate cup 50. This impact load, then, is transferred from the upper end of the dust tube 28, through the jounce bumper 40, through the jounce rate cup 50 and through the shock upper mount assembly 24 into the vehicle structure 26. The jounce bumper 40 and jounce rate cup 50, being made of elastomeric materials, will flex to absorb energy and hence reduce the peak impact force transmitted to the vehicle structure 26. The geometry of the jounce rate cup 50, having the flanges 52, 56 separated by the vertical flange 54 (creating the gap 58), allows for a significant amount of flexing, which also helps minimize the impact forces transferred to the vehicle structure 26. This improved load transfer is accomplished while minimizing the packaging space for the jounce bumper 40 and jounce rate cup 50 and allowing for attachment of the upper end of the dust boot 70.

While certain embodiments of the present invention have been described in detail, those familiar with the art to which this invention relates will recognize various alternative designs and embodiments for practicing the invention as defined by the following claims.

What is claimed is:

1. A vehicle suspension system comprising:
a shock upper mount assembly configured to mount to vehicle structure;
a jounce bumper being made of an elastomeric material and including a vertically extending rod bore configured to mount around a rod of a shock absorber; and
a jounce rate cup being made of an elastomeric material and including a generally cylindrical vertically extending portion that defines a vertically extending rod bore configured to mount around the rod, a horizontally extending support flange extending radially outward from the vertically extending portion and having a lower surface mounted on the jounce bumper, a horizontally extending dust boot attachment flange extending radially outward from the vertically extending portion and spaced vertically upward from the support flange and having an upper surface located below and adjacent to the shock upper mount assembly, and the vertically extending portion including a generally cylindrical vertical flange extending between radially inner portions of the support flange and the dust boot attachment flange to define a gap between the support flange and the dust boot attachment flange.

2. The vehicle suspension system of claim 1 including a dust boot having an upper mounting flange, the upper mounting flange mounted to the dust boot attachment flange.

3. The vehicle suspension system of claim 1 wherein the vertically extending flange of the jounce rate cup includes an upper mount engagement flange extending upward from the dust boot attachment flange, the upper mount engagement flange being in contact with the shock upper mount assembly.

4. The vehicle suspension system of claim 3 wherein the shock upper mount assembly includes an upper mount housing and the upper mount engagement flange has a vertically extending cylindrical shape with a radially outer surface in contact with the upper mount housing.

5. The vehicle suspension system of claim 3 wherein the shock upper mount assembly includes an upper mount bushing assembly and the upper mount engagement flange has a vertically extending cylindrical shape with a top surface in contact with the upper mount bushing assembly.

6. The vehicle suspension system of claim 1 wherein the jounce rate cup is made of thermoplastic polyurethane.

7. The vehicle suspension system of claim 1 wherein the jounce rate cup is a single, monolithic piece.

8. A vehicle suspension system comprising:
a shock upper mount assembly configured to mount to vehicle structure;
a shock absorber having a dust tube and a rod slidably mounted in the dust tube and extending telescopically upward from the dust tube, the rod having an upper end mounted to the shock upper mount assembly;
a jounce bumper located above the dust tube and being made of an elastomeric material, the jounce bumper including a rod bore through which the rod extends; and
a jounce rate cup being made of an elastomeric material and including a generally cylindrical vertically extending portion that defines a vertically extending rod bore configured to mount around the rod, a horizontally extending support flange extending radially outward from the vertically extending portion and having a lower surface mounted on the jounce bumper, a horizontally extending dust boot attachment flange extending radially outward from the vertically extending portion and spaced vertically upward from the support flange and having an upper surface located below and adjacent to the shock upper mount assembly, and the vertically extending portion including a generally cylindrical vertical flange extending between radially inner portions of the support flange and the dust boot attachment flange to define a gap between the support flange and the dust boot attachment flange.

9. The vehicle suspension system of claim 8 including a dust boot having an upper mounting flange, the upper mounting flange mounted to the dust boot attachment flange.

10. The vehicle suspension system of claim 9 wherein the jounce rate cup is a single, monolithic piece.

11. The vehicle suspension system of claim 8 wherein the vertically extending flange of the jounce rate cup includes an upper mount engagement flange extending upward from the dust boot attachment flange, the upper mount engagement flange being in contact with the shock upper mount assembly.

12. The vehicle suspension system of claim 11 wherein the shock upper mount assembly includes an upper mount housing and the upper mount engagement flange has a vertically extending cylindrical shape with a radially outer surface in contact with the upper mount housing.

13. The vehicle suspension system of claim 11 wherein the shock upper mount assembly includes an upper mount bushing assembly and the upper mount engagement flange has a vertically extending cylindrical shape with a top surface in contact with the upper mount bushing assembly.

14. The vehicle suspension system of claim 11 wherein the jounce rate cup is a single, monolithic piece.

15. The vehicle suspension system of claim 8 wherein the jounce rate cup is made of thermoplastic polyurethane.

\* \* \* \* \*